(12) United States Patent
Hogan

(10) Patent No.: US 10,198,644 B2
(45) Date of Patent: Feb. 5, 2019

(54) OPTICAL COHERENCE TOMOGRAPHY ARRAY BASED SUBDERMAL IMAGING DEVICE

(71) Applicant: Joshua Noel Hogan, Los Altos, CA (US)

(72) Inventor: Joshua Noel Hogan, Los Altos, CA (US)

( * ) Notice: Subject to any disclaimer, the term of this patent is extended or adjusted under 35 U.S.C. 154(b) by 0 days.

(21) Appl. No.: 15/851,248

(22) Filed: Dec. 21, 2017

(65) Prior Publication Data

US 2018/0157924 A1    Jun. 7, 2018

Related U.S. Application Data

(63) Continuation of application No. 15/339,683, filed on Oct. 31, 2016, now Pat. No. 9,892,334.

(60) Provisional application No. 62/267,211, filed on Dec. 14, 2015, provisional application No. 62/249,309, filed on Nov. 1, 2015.

(51) Int. Cl.
*G06K 9/00* (2006.01)
*G01B 9/02* (2006.01)

(52) U.S. Cl.
CPC ..... *G06K 9/00885* (2013.01); *G01B 9/02091* (2013.01); *G06K 9/0004* (2013.01); *G06K 9/00046* (2013.01); *G06K 2009/00932* (2013.01)

(58) Field of Classification Search
CPC ............ G01B 9/02091; G01B 9/02049; G06K 9/0004; G06K 9/00046
See application file for complete search history.

(56) References Cited

U.S. PATENT DOCUMENTS

| | | | |
|---|---|---|---|
| 7,526,329 B2 | 4/2009 | Hogan | |
| 7,751,862 B2 | 7/2010 | Hogan | |
| 2005/0163353 A1* | 7/2005 | Schneider | G06K 9/0002 382/124 |
| 2007/0258628 A1* | 11/2007 | Schneider | A61B 5/1172 382/124 |
| 2010/0251824 A1* | 10/2010 | Schneider | A61B 5/1172 73/620 |
| 2015/0363630 A1 | 12/2015 | Hogan | |
| 2016/0183801 A1 | 6/2016 | Hogan | |

FOREIGN PATENT DOCUMENTS

WO    WO/2016/109844    7/2016

* cited by examiner

*Primary Examiner* — Jonathan Hansen

(57) ABSTRACT

The invention teaches a multiple reference optical coherence tomography scanner that provides a subdermal fingerprint scan, covers an area of approximately 16 mm-17 mm×10 mm in less than a second, and fits into a slim profile of less than 6 mm in thickness, thereby fitting within the slim consumer electronics such as the iPhone and similar consumer electronics. Various embodiments are taught.

5 Claims, 8 Drawing Sheets

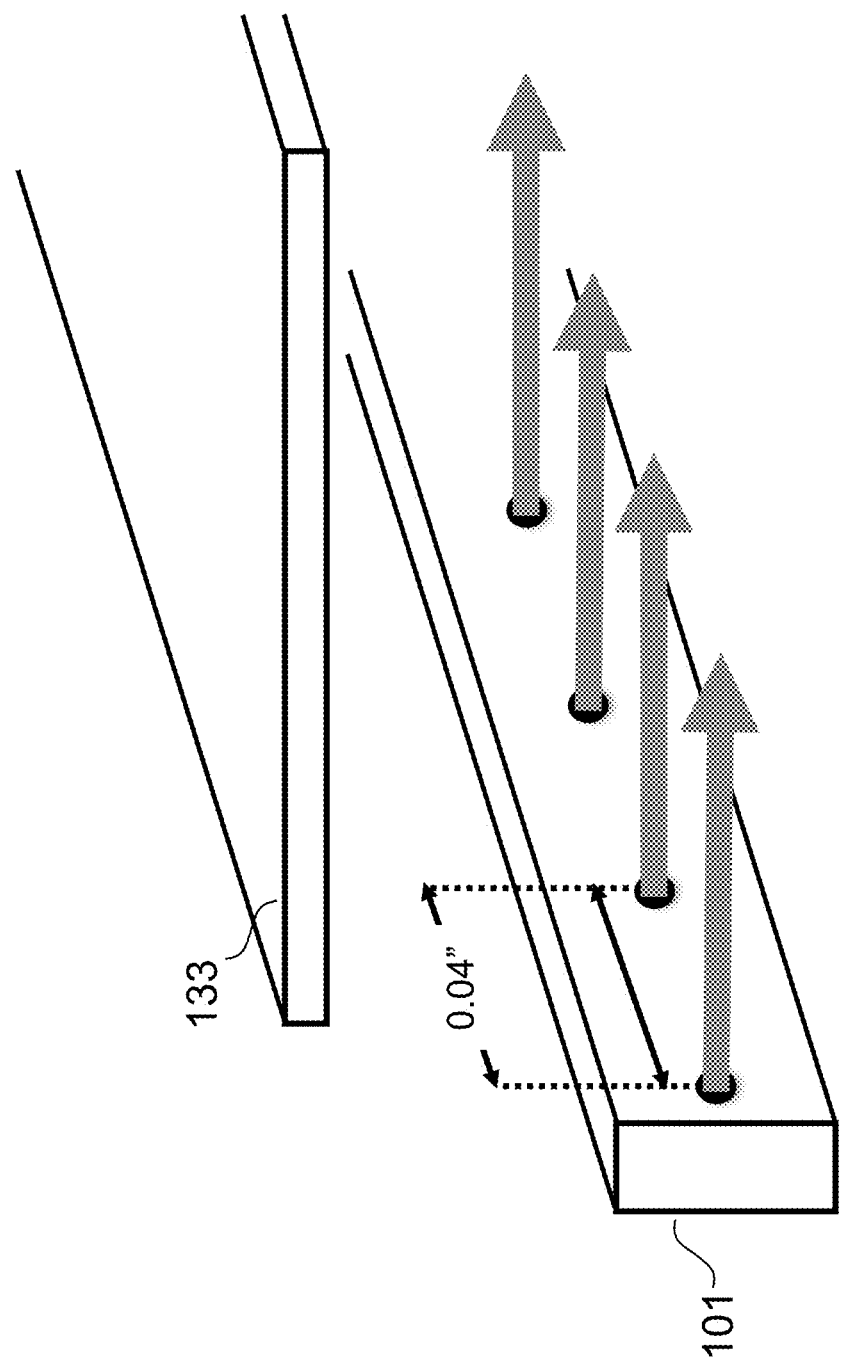

OPTICAL COHERENCE TOMOGRAPHY ARRAY BASED SUBDERMAL IMAGING DEVICE

RELATED APPLICATIONS

This utility application, is a continuation of U.S. application Ser. No. 15/339,683, which claims priority from U.S. provisional application 62/249,309 of the same title, and from U.S. provisional 62/267,211 Parallel Optical Source Device, the entirety of each of which is incorporated by reference as if full set forth herein. The instant application is also is related to the following U.S. applications and patents, the entireties of each of which are incorporated by reference as if fully set forth herein: U.S. provisional 62/267,211 Parallel Optical Source Device; WO/2016/109844 Reference signal filter for interferometric system; U.S. application Ser. No. 14/975,745 A polarized OCT system with improved SNR; U.S. application Ser. No. 14/738,919, filed Jun. 14, 2015, entitled System and Method for Fingerprint Validation, publication US 2015-0363630 A1; U.S. Pat. No. 7,526,329 Multiple Reference Non-invasive Analysis System; U.S. Pat. No. 7,751,862 Frequency Resolved Imaging System.

GOVERNMENT FUNDING

None

FIELD OF USE

Security applications.

BACKGROUND

Security is an ubiquitous concern in modern life. Many consumer electronic devices are currently equipped with fingerprint scanners to unlock the device. However, surface fingerprints are fairly easy to fake. A need exists for more secure means of preventing unauthorized access to consumer electronics. Moreover, although more secure means do currently exist, such approaches fail to meet consumer expectations of nearly instantaneous access to electronic devices. Further obstacles to security arise as consumer electronics manufacturers respond to consumer demands for smaller, lighter devices, while simultaneously offering price reductions. Solutions to security are rejected if such approaches do not fit the expected form factor, or increase the selling price of the device. Lastly, standards exist, such as those adopted by NIST, and purveyors of security must also satisfy such standards.

For a device to be accepted by consumers, user authentication is expected to be very secure and very fast, as well as robust. It is expected to be nearly transparent to the user, adding neither weight nor volume to the device, as well as being included at no extra charge in the price of the device.

What is needed is a rapid, secure fingerprint scan device. What is further needed is a rapid secure fingerprint scan device that fits into the form of current electronic devices. What is also needed is a rapid highly secure user authentication that is robust, withstanding of consumer handling and device use conditions. Further needed is an approach that is sufficiently low cost so that price of the device is not increased by virtue of the included user authentication feature.

BRIEF SUMMARY OF THE INVENTION

The invention meets at least all of the above cited unmet needs. The invention teaches a multiple reference optical coherence tomography scanner that provides a subdermal fingerprint scan, covers an area of approximately 16 mm-17 mm×10 mm in less than a second, and fits into a slim profile of the order of 6 mm in thickness, thereby fitting within the slim consumer electronics such as the iPhone and similar consumer electronics.

The scan of the area of interest is accomplished by combining a multiple reference optical coherence tomography system with a single reference mirror, with source arrays aligned laterally to the left and right of the central reference mirror. The scanning module contains reference mirror (which mirror oscillates laterally) and a left and right beamsplitter in the path of the radiation incoming from left and right radiation sources. The scanning module moves laterally, along the same axis as the oscillating reference mirror, and accomplishes an area of scan effectively doubled by the center reference mirror. The left and right banks of radiation sources enable scans of 17 mm along the Z axis.

The scan rate produces a resolution that, when translated to dpi, satisfies at least the NIST FAP10 standard for fingerprint security. Moreover, the scan includes a subdermal fingerprint and, consequently, is more secure than a surface fingerprint.

BRIEF DESCRIPTION OF THE DRAWINGS

FIG. 1B is a perspective view of one of the pair of housings of a plurality of sources according to the embodiment depicted in FIG. 1A, according to the invention.

DETAILED DESCRIPTION OF A PREFERRED EMBODIMENT

The invention uses multiple reference optical coherence tomography, (abbreviated MRO-OCT), where multiple reference radiation reflections result in overlapping scan segments at precise target depths. The reader may refer to Multiple Reference Non-invasive Analysis System, U.S. Pat. No. 7,526,32 and Frequency Resolved Imaging System, U.S. Pat. No. 7,751,862 for further information.

In this invention, a single reference mirror is centered between a left and right source radiation, positioned perpendicularly above a target, and beneath a detection array. The reference mirror is moved in an oscillatory manner by a first actuator, and scanning is done on both the left and right side of the mirror, and along the length of the mirror.

At a height of 2 mm, and a depth of 17 mm, and a width of less than 5 mm, a lateral movement of the scanning module by a second actuator, and the oscillation of the mirror generates interference signals and produces a scanning area covering 10 mm of the target. The second actuator, coupled to the scanning module, thus produces the requisite width while only moving half of the distance.

Multiple sources minimize the scanning requirement in the perpendicular lateral direction.

At 50-micron resolution, 3000 scans cover a 10 mm×17 mm area in less than one second, satisfying at least the NIST FAP 10 standard for fingerprints.

In one embodiment, the invention provides a subdermal fingerprint scan in the time it takes to briefly touch a glass pad. Moreover, the entire scanning apparatus moves approximately only 5 mm and fits within the current size—particularly the thinnest of popular mobile phones and devices, i.e. approximately 6 mm or less.

It can be appreciated that this has application in unlocking consumer electronics such as iPhones, iPads, and other consumer electronics, in secure banking transactions, in authorizing access to sites, automobiles, etc. and in border control.

Figure 1A:
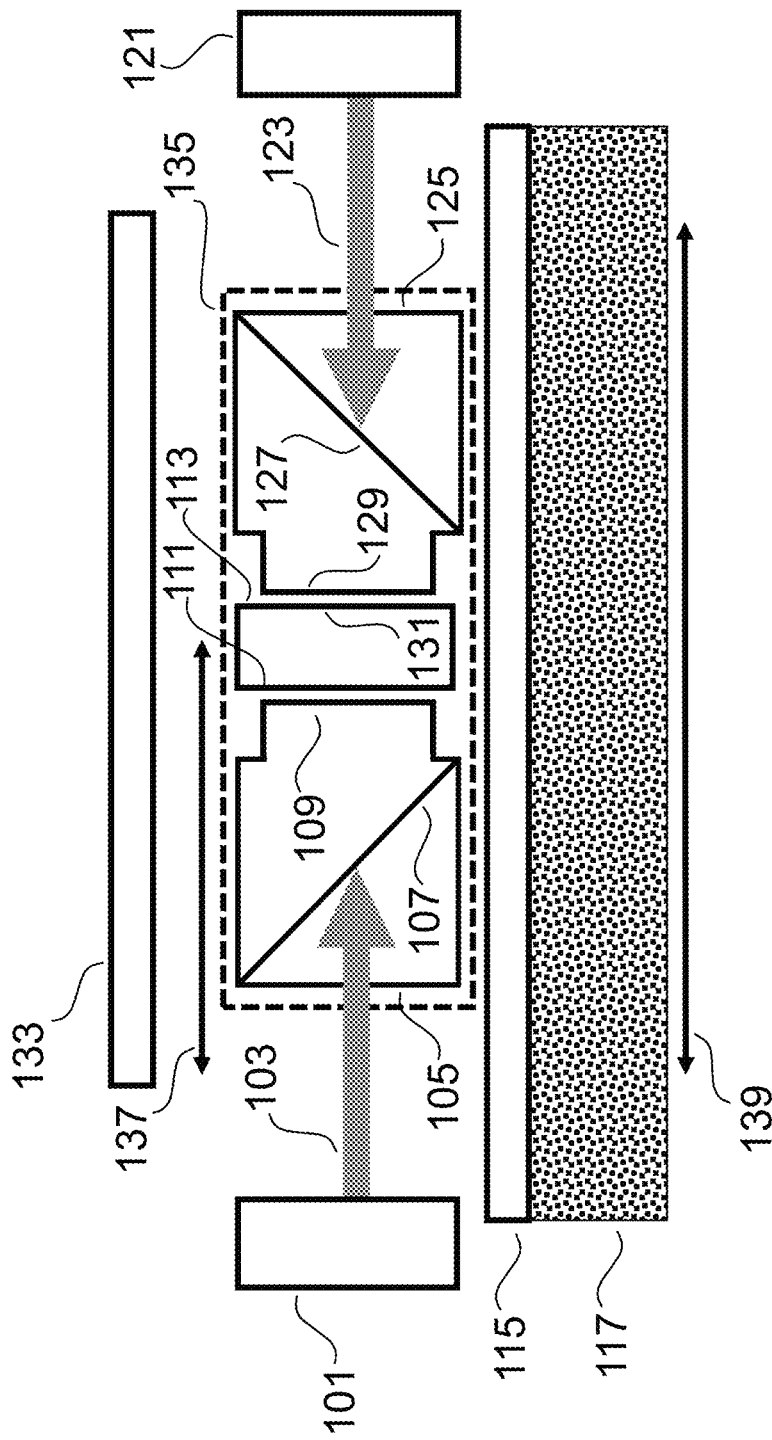
FIG. 1A is a block diagram of a cross section of the array based multiple reference optical coherence scanning device according to the invention.

Referring to FIG. 1A, a cross section of a preferred embodiment is depicted, comprising
a first housing 101 of a first set of optical sources;
a second housing 121 of a second set of optical sources, where radiation 103 from said first set of sources in said first housing 105 is directed to a scanning module 135 from one linear direction, and
radiation 123 from said second set of sources in said second housing 121 is direct to said scanning module 135 from the opposite direction;
The scanning module 135 contains:
a first optical beamsplitter 105 with a first beamsplitting surface 107 and a first partially reflective surface 109 where incoming probe radiation 103 passes through beamsplitting surface 107 to a first highly reflective surface 111 of the optic 113, said optic 113 having a surface 111 where
said first partially reflective surface 109 is parallel to the surface 111 of the reference optic 113 and is partially reflective (typically approximately 80% reflective) causing multiple reflections as taught in Multiple Reference Non-invasive Analysis System, U.S. Pat. No. 7,526,32 and Frequency Resolved Imaging System, U.S. Pat. No. 7,751,862;

A second optical beamsplitter 125 with a second beamsplitting surface 127 and a second partially reflective surface 129 where incoming probe radiation 123 passes through beamsplitting surface 127 to a second highly reflective surface 131 of the optic 113, said optic having a surface 131 where
said second partially reflective surface 129 is parallel to the surface 131 of the optic 113 and is partially reflective (typically approximately 80% reflective) causing multiple reflections as taught in Multiple Reference Non-invasive Analysis System, U.S. Pat. No. 7,526,32 and Frequency Resolved Imaging System, U.S. Pat. No. 7,751,862. As used herein, "highly reflective" means reflectivity equal to or greater than 95%.

Thus both the first and the second optical beamsplitters 105, 125 separate the radiation into reference radiation and probe radiation. The reference radiation is reflected by 109 and 111, and is directed to the detector array. Similarly for the other side.

The probe radiation is directed to the target, where scattered probe radiation returns through the beamsplitter to the detector array. This occurs on both sides.

The reference optic 113 with the two highly reflective surfaces 111, 131 is coupled to a first actuator (not shown) which oscillates the optic—and hence the highly reflective surfaces—in a lateral (left-right) direction. In the preferred embodiment, the length of the optic 113 is approximately 16-17 mm.

The scanning module 135 is coupled to a second actuator (not shown) is and capable of lateral motion, moving uniformly in a lateral direction (along the same axis as the oscillatory motion of the reference optic 113) for a distance of approximately 5 mm. This accomplishes a total lateral scan of approximately 10 mm.

A two dimension (2D) detector array 133 receives optical radiation reflected from a target 117, as well as reference radiation from the surfaces of the reference optic and the partial mirrors 109 and 129, creating interference signals corresponding to depth scans of the target. This is described in detail in Multiple Reference Non-invasive Analysis System, U.S. Pat. No. 7,526,32 and Frequency Resolved Imaging System, U.S. Pat. No. 7,751,862.

A surface layer 115, typically glass, provides contact surface with the target 117. The path length of one half of the scanning module 137 is depicted, along with the complete scan coverage range 139 according to the invention. The invention provides for oscillatory motion of the reference optic 113, as well as lateral movement of the scanning module 135.

The target is placed in contact with the surface layer or glass, and during the time of contact, scans of the target are obtained. It can be appreciated that in an embodiment where a single pair of radiation sources are used (rather than a plurality) the scan can be accomplished by moving the entire scanning module in the orthogonal lateral direction for the full length. However, scan time—the time to acquire a fingerprint—will be longer. In such an embodiment, the detector array need only be a one dimensional—1D —array. Alternatively, a pair of detectors could be attached to the scanning module itself.

Referring to FIG. 1B, the preferred embodiment, which shows a perspective of the first housing relative to the detector array, the first housing 101 enables emission of a plurality of radiation source beams (103 in FIG. 1A). A linear array is depicted; a corresponding array is provided in the second housing (not shown). The distance between the radiation beams determine the distance the scanning module need move in the perpendicular or orthogonal lateral direction. In FIG. 1B, the distance is 0.04 inches or approximately 1 mm. As also illustrated in FIG. 4, the dimensions of the aperture of the radiation source (not depicted) less than 1 mm in diameter, and the vertical dimension (height) about 5 mm and a depth of 17 mm.

Figure 2:
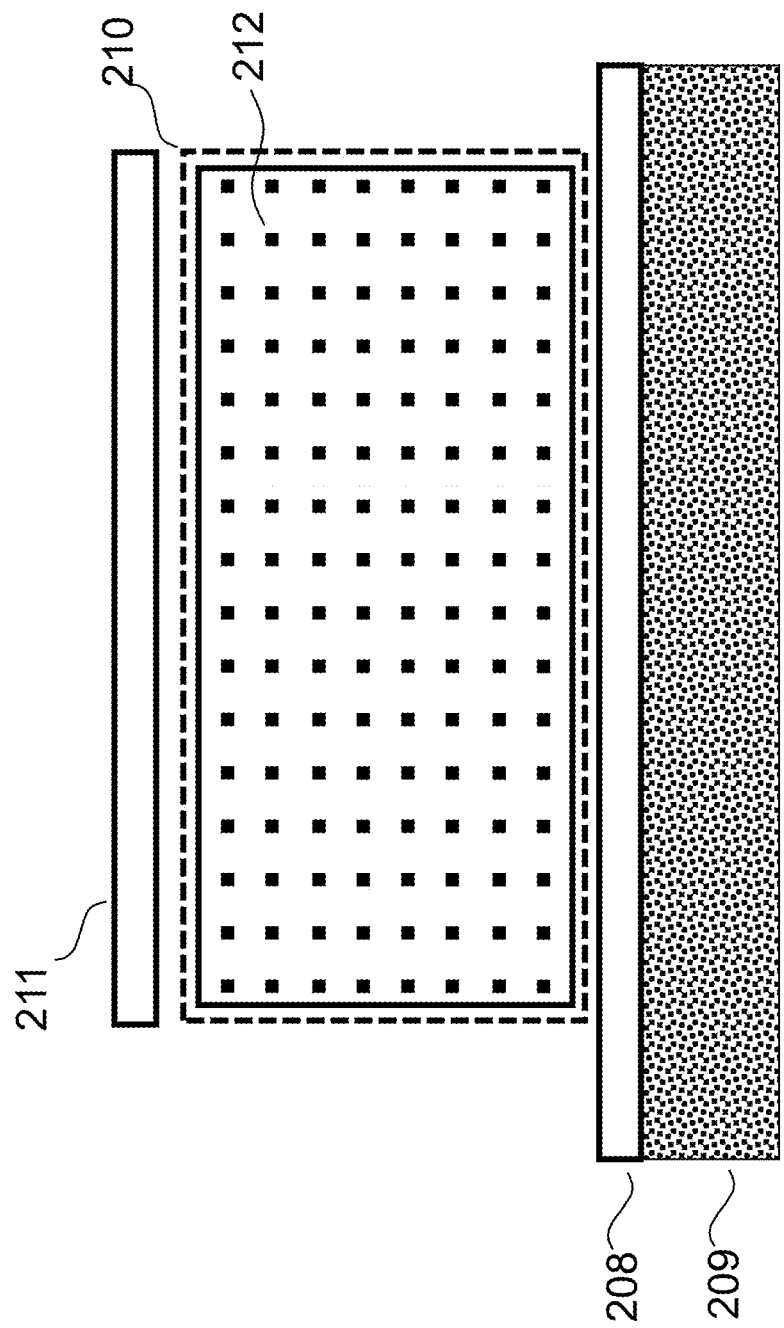
FIG. 2 depicts an interior cross section of the scanning module, illustrating an array configuration of sources, according to an alternate embodiment of the invention.

Referring now to FIG. 2, an alternate embodiment provides an array of sources, rather than the linear source arrangement as seen in FIG. 1B. An array further reduces the lateral scanning requirements. FIG. 2 schematically depicts an interior cross section of the scanning module (as viewed from the anterior surface of the mirror), and depicts an array configuration of sources showing: a target to be scanned 209; contact surface 208; scanning module 210 (in FIG. 1A, 135); a two dimensional detector array 211; a cross section view of the source 212, depicting an array of optical radiation sources (pictured as black squares in a regular grid arrangement). It can be appreciated that the depiction is meant to suggest a plurality, and not intended to limit the arrangement to regular rows and columns.

Figure 3:
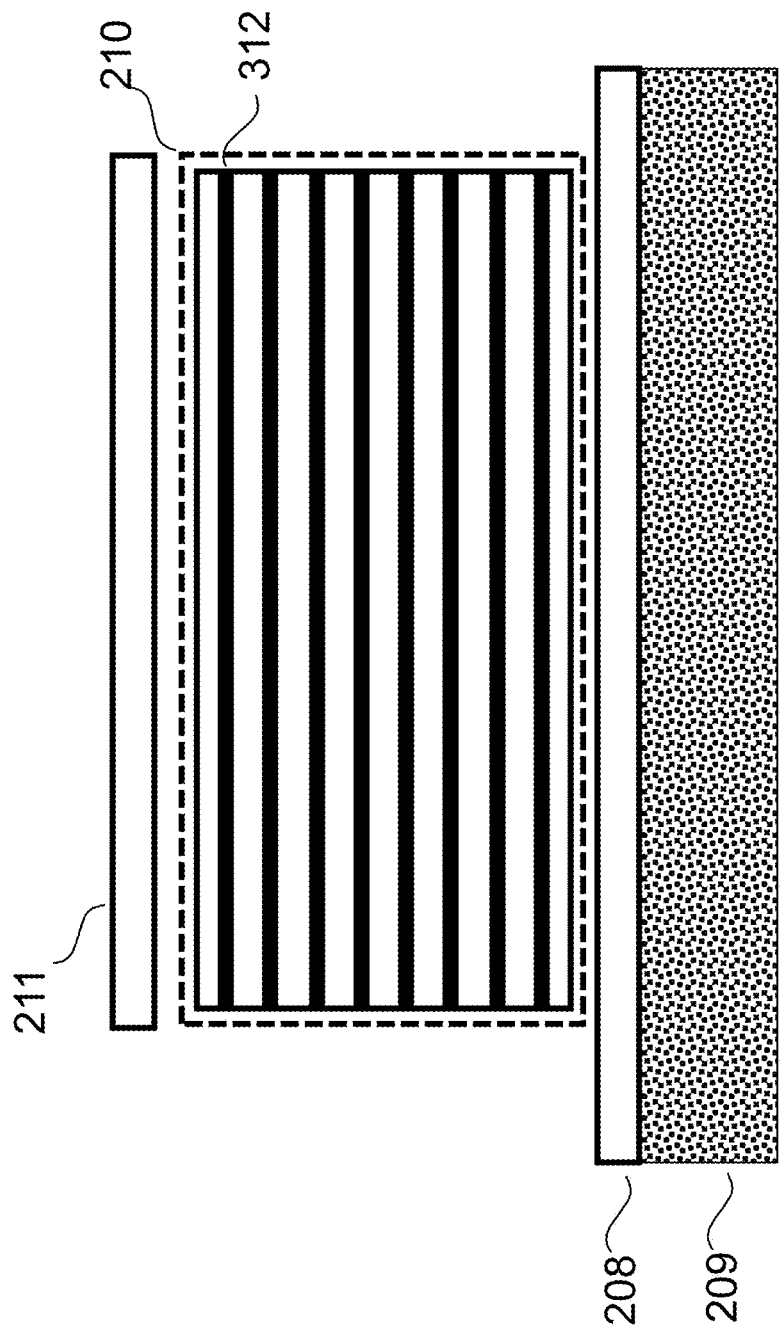
FIG. 3 depicts a cross section as in FIG. 2, depicting the source array as horizontal black bands, representing linear apertures through which the source radiation is emitted, according to an alternate embodiment of the invention.

Referring now to FIG. 3, FIG. 3 is a cross section as is FIG. 2, and depicts an alternate embodiment using line optical sources, where an LED array, or an edge emitting LED array, is emitting through a parallel arrangement of collimating lenses, or any line source, where the numbered components are as follows: target 209; contact plate 208; scanning module 210 (135 in FIG. 1A); two dimensional detector array; and a plurality of line optical sources 312, where an LED array is emitting source radiation through a parallel arrangement of collimating lenses.

Figure 4:
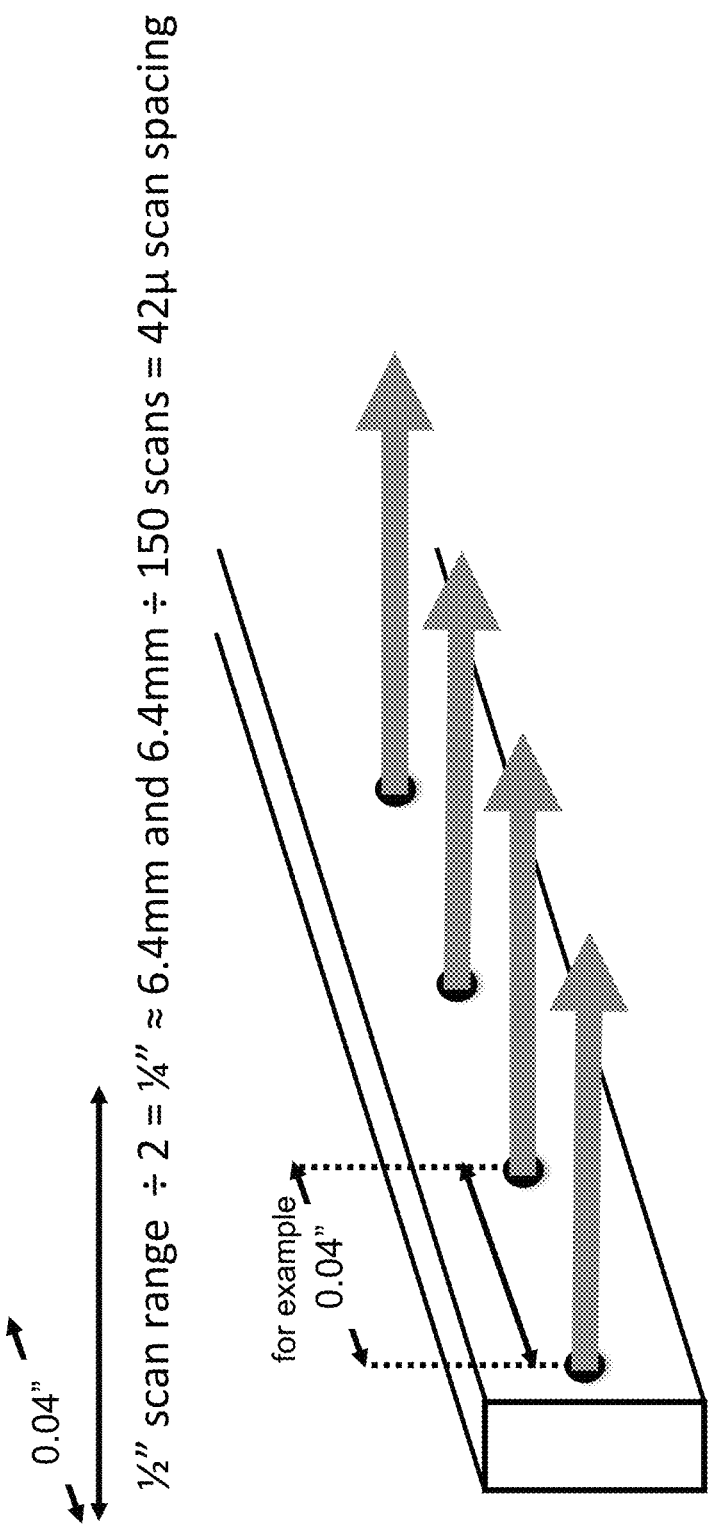
FIG. 4 illustrates the spacing of the sources depicted in FIG. 1B, illustrating scan density resolution that satisfies NIST standard FAP10 (500 dpi) in the application of fingerprint security.

Referring now to FIG. 4, a view of the first housing as in FIG. 1B, details on the probe beam spacing in a preferred embodiment illustrate how the NIST standard of 500 dpi can be satisfied by a linear array according to the invention, with a scan rate of 3000 scans per second. Moreover, the dimensions as set forth in FIG. 4 illustrate the low height and narrow width, enabling the inventive device to fit in the limited space available in current consumer electronics such as mobile phone and tablets.

Referring to FIG. 4, exemplar dimensions: 0.65"÷16=0.04 inches=1 mm and 1 mm÷20 scans=50μ scan spacing; ½" scan range÷2=¼"≈6.4 mm and 6.4 mm÷150 scans=42μ scan spacing; 500 dpi corresponds to spacing of ≈49μ; 150× 20=3000 takes time of 1 second at 3000 scans per second.

Although the preferred embodiment uses MRO OCT, alternate embodiments use conventional time domain OCT, and swept source OCT. In conventional time domain OCT, the reference optic 113 moves the amount to be scanned in the depth of the target (e.g. up to approximately 1 mm) and there is no requirement for the partially reflective surfaces 109 and 129. In an alternate embodiment using swept source OCT, the reference optic 113 is stationary, and there is no requirement for the partially reflective surfaces 109 and 129.

Figure 5:
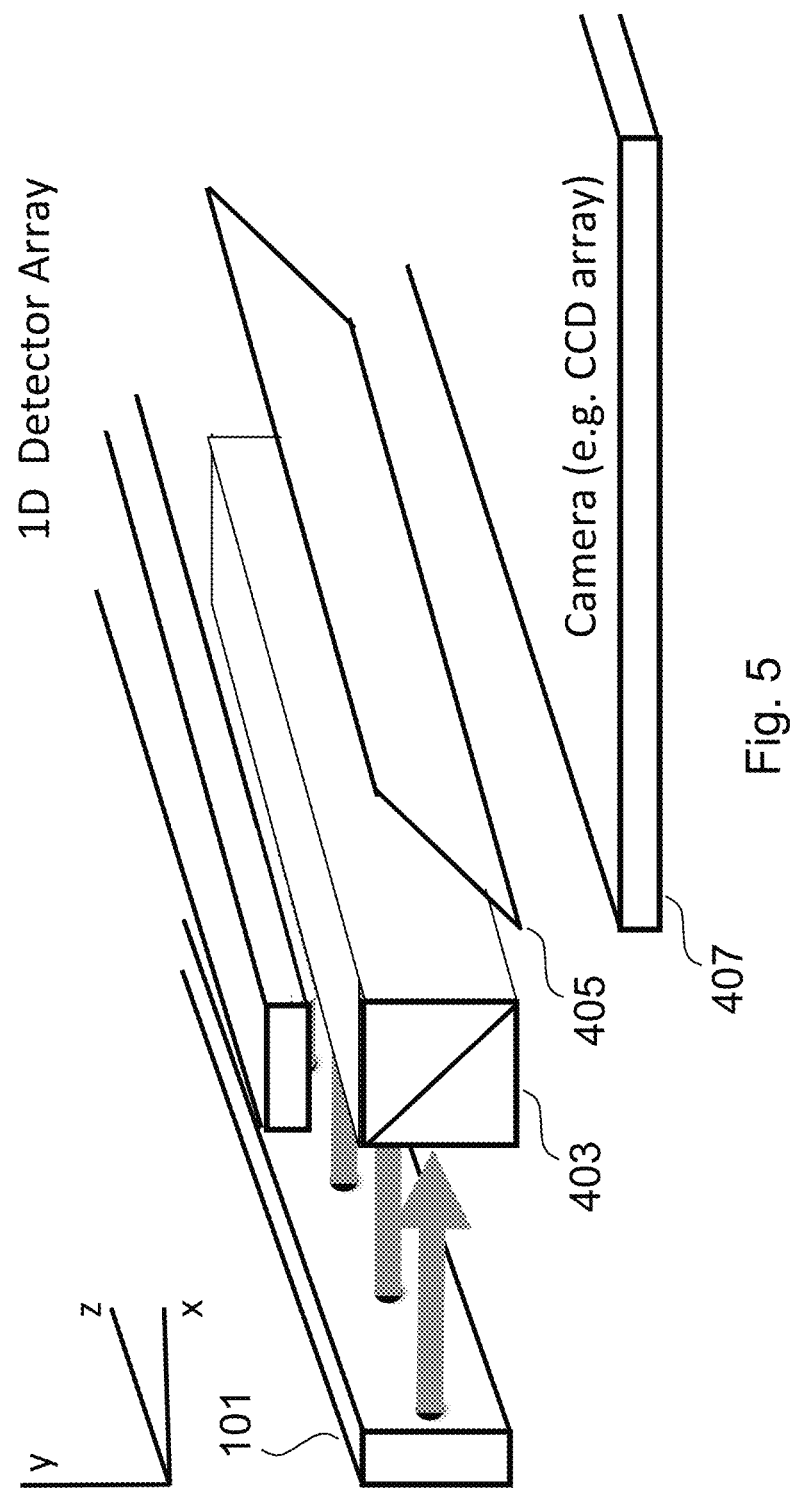
FIG. 5 depicts an alternate embodiment of the invention.

Referring now to FIG. 5, an alternate embodiment of the invention is depicted. In FIG. 5, the optical source 101 as an array of optical sources going through a long beam splitter 403 with the probe beams directed upwards by a mirror 405. The beam splitter 403 also directs the reference beams to partial mirrors and modulating reference mirrors (not shown). This arrangement reduces the required travel in the "z" direction. Scanning in the "x" direction provides an OCT image of the same region also imaged by a conventional camera 407 (such as a CCD array) and is suitable for fingerprint imaging.

Figure 6:
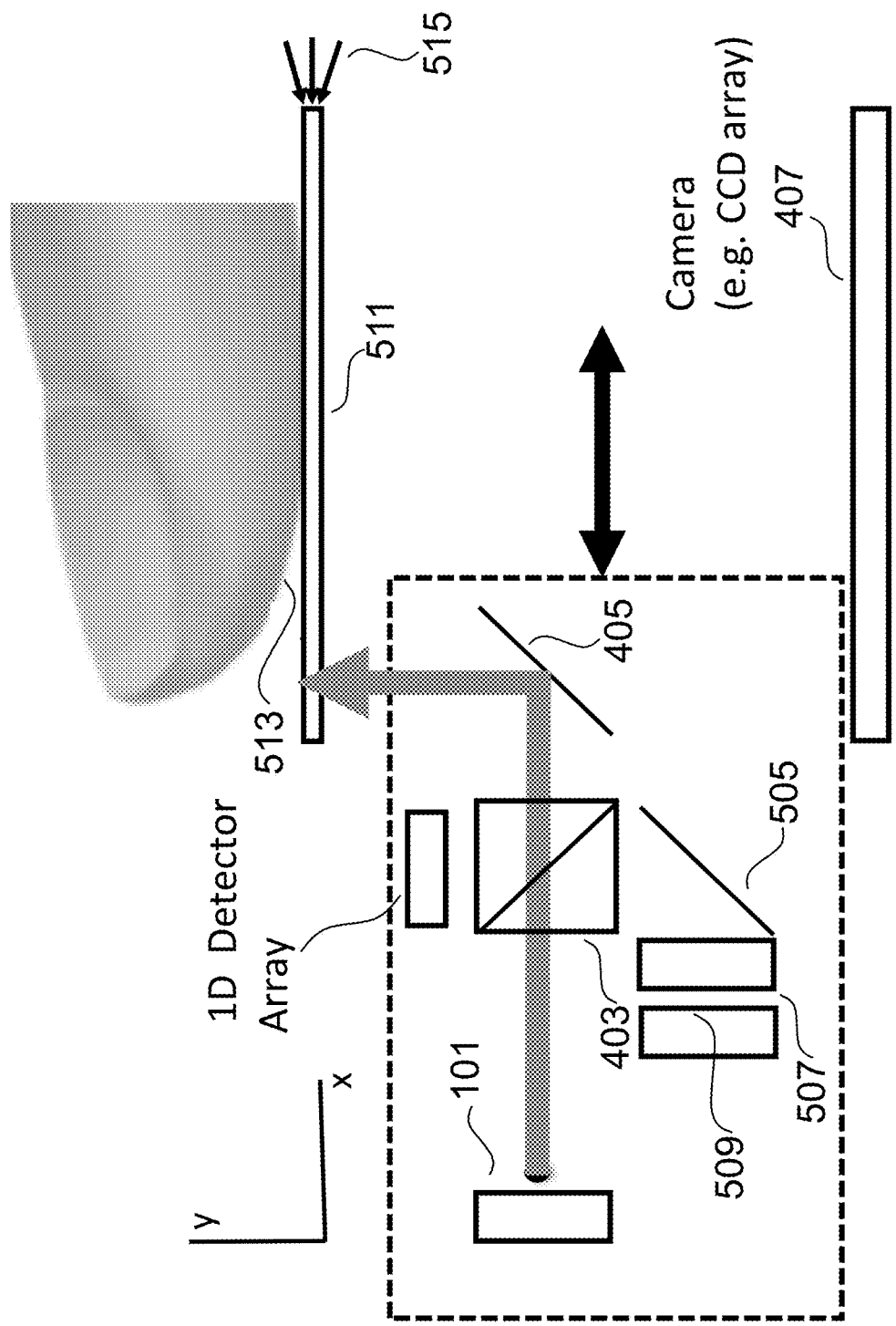
FIG. 6 depicts an alternate embodiment of the invention.

Referring now to FIG. 6, an alternate embodiment of the invention is depicted. Numbered elements are consistent with FIG. 5. In FIG. 6, depicted is an X,Y projection of the same system as in FIG. 5 and additionally showing the reference path turning mirror 505, the partial reflective surface 507 and the modulating reference mirror 509. Also depicted is a glass window—a target contact surface—511 on which a finger 513 rests for the fingerprint application, i.e. where the target is a fingerprint. A light source 515 directs light along the target contact surface. Owing to frustrated internal reflection, light scattering occurs only where target is in contact with the surface. In this way, an image of the target—a fingerprint—is obtained. OCT scanning is accomplished by lateral translation in the "x" direction of the OCT module included in the dashed box. It can be appreciated that in this embodiment, the camera capturing the full surface fingerprint has a portion of the image blocked as the OCT system scans.

Figure 7:
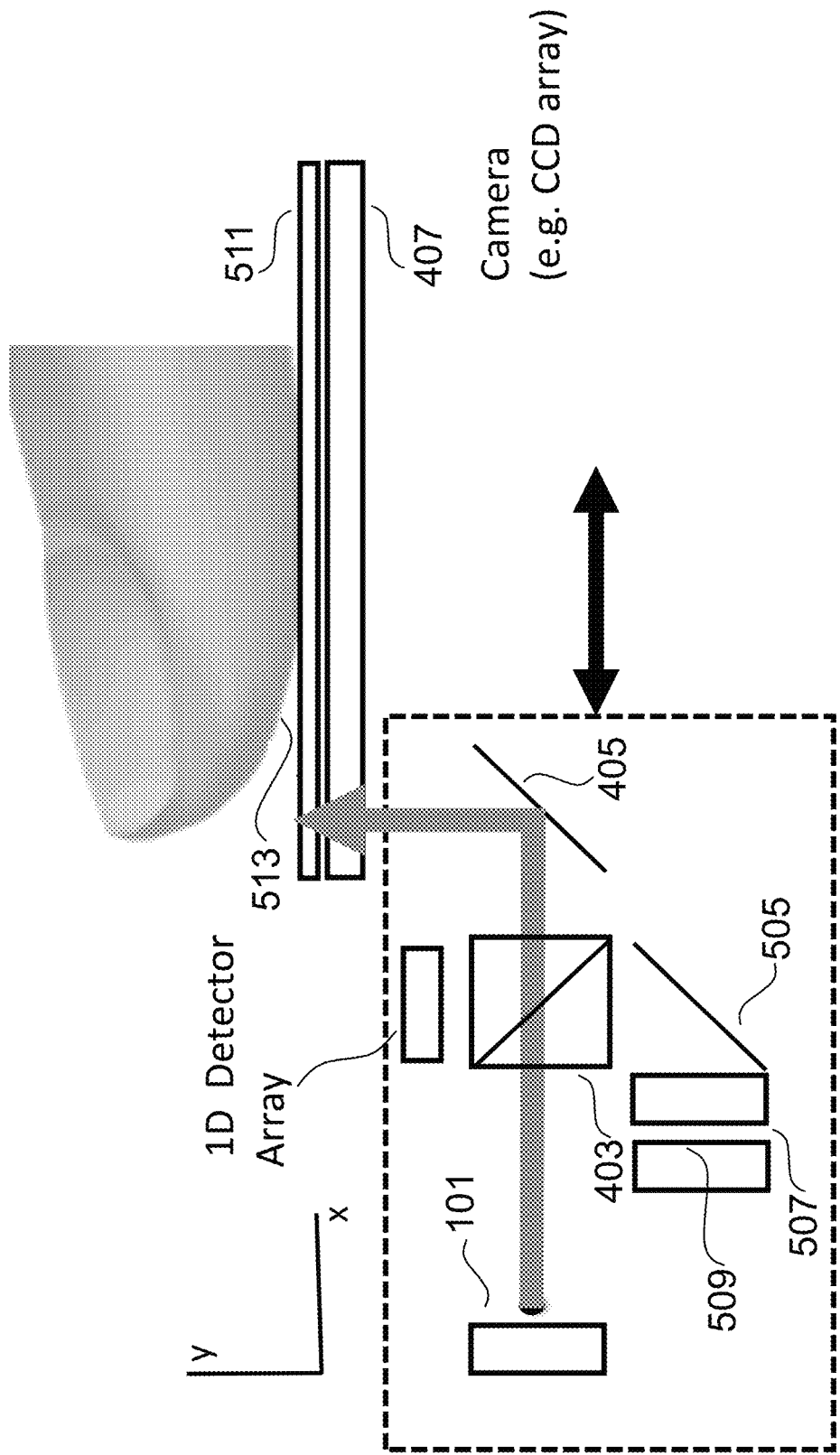
FIG. 7 depicts an alternate embodiment of the invention.

Referring now to FIG. 7, depicted is an X,Y projection of the same system as in FIG. 5 and additionally showing the reference path turning mirror 505, the partial reflective surface 507 and the modulating reference mirror 509. Also depicted is a glass window 511 on which a finger 513 rests for the fingerprint application. The double headed arrow indicates a lateral motion; the OCT is mounted on an actuator (not shown) a continuous lateral scan is again accomplished by lateral translation in the "x" direction of the OCT module included in the dashed box. It can be appreciated that in this embodiment, the camera needs to be transparent at the wavelength of the OCT system. Such cameras can be fabricated using thin film technology consisting of arrays of light detectors and transistor arrays, etc.

A light source similar to 515 of FIG. 6 directs light along the target contact surface. Owing to frustrated internal reflection, light scattering occurs only where target is in contact with the surface. Alternatively illumination could be achieved by a thin array of transparent array of light sources. In this way, an image of the target—a fingerprint—is obtained.

The examples provided herein are not to be construed as limiting the invention, which extends to the scope of the claims, the specification and the drawings included herewith and to the equivalencies thereto.

I claim:

1. A system for imaging a target, said imaging system comprising:
   an optical coherence tomography system
      with an array of optical sources, and
      a beam splitter of a predetermined length in the optical path of said array of optical sources, and
      an actuator that translates said optical coherence tomography system in a lateral direction, thereby acquiring a plurality of optical coherence tomography depth scans of said target;
   a contact surface on which said target is placed and where said contact surface is transmissive; and
   a camera which detects light scattered due to frustrated total internal reflection, where such frustration of total internal reflection is due to target contact with said contact surface, and produces an image of said target, so that
   said target is imaged in two and three dimensions approximately simultaneously.

2. The system of claim 1 wherein said target is a fingerprint.

3. The system of claim 1 wherein said array of optical sources is a linear array of broad band optical sources.

4. The system of claim 1 wherein said array of optical sources is a three dimensional array of broad band optical sources.

5. The system of claim 1 wherein said array of optical sources is an array of swept sources.

* * * * *